United States Patent [19]

Fischer et al.

[11] 4,442,311

[45] Apr. 10, 1984

[54] PARTICLE TRAP TO SHEATH CONTACT FOR A GAS-INSULATED TRANSMISSION LINE HAVING A CORRUGATED OUTER CONDUCTOR

[75] Inventors: William H. Fischer; Alan H. Cookson; Kue H. Yoon, all of Pittsburgh, Pa.

[73] Assignee: The United States of America as represented by the United States Department of Energy, Washington, D.C.

[21] Appl. No.: 439,246

[22] Filed: Nov. 4, 1982

[51] Int. Cl.³ .................... H01B 9/06; H01B 9/04; H02G 5/06
[52] U.S. Cl. .................................. 174/14 R; 174/28
[58] Field of Search ............... 174/14 R, 16 B, 27, 174/28, 99 R, 99 B, 99 E; 138/108, 112, 113, 114; 339/1 R, 6 R, 6 RL, 9 R, 9 E

[56] References Cited

U.S. PATENT DOCUMENTS 4,328,391  5/1982  Cookson ..................... 174/14 R
4,335,267  6/1982  Hopkins ..................... 174/14 R Primary Examiner—Laramie E. Askin
Attorney, Agent, or Firm—M. S. Yatsko

[57] ABSTRACT

A particle trap to outer elongated conductor or sheath contact for gas-insulated transmission lines. The particle trap to outer sheath contact of the invention is applicable to gas-insulated transmission lines having either corrugated or non-corrugated outer sheaths. The contact of the invention includes an electrical contact disposed on a lever arm which in turn is rotatably disposed on the particle trap and biased in a direction to maintain contact between the electrical contact and the outer sheath.

6 Claims, 4 Drawing Figures

PARTICLE TRAP TO SHEATH CONTACT FOR A GAS-INSULATED TRANSMISSION LINE HAVING A CORRUGATED OUTER CONDUCTOR

GOVERNMENT CONTRACT

The Government has rights in this invention pursuant to Contract No. ET-78-C01-2870 awarded by the United States Department of Energy.

CROSS-REFERENCE TO RELATED APPLICATIONS

This application is related to concurrently filed co-pending applications "Conductor Load Bearing Roller For A Gas-Insulated Transmission Line Having A Corrugated Outer Conductor", Ser. No. 439,247, filed Nov. 4, 1983, by W. H. Fischer and K. H. Yoon; "Non-Binding Conductor Load Bearing Roller For A Gas-Insulated Transmission Line Having A Corrugated Outer Conductor", Ser. No. 439,248, filed Nov. 4, 1982, by W. H. Fischer; and "Particle Trap To Sheath Non-Binding Contact For A Gas-Insulated Transmission Line Having A Corrugated Outer Conductor", Ser. No. 439,245, filed Nov. 4, 1982, by W. H. Fischer, all assigned to the same assignee as the present invention.

BACKGROUND OF THE INVENTION

1. Field of the Invention:

The invention relates in general to gas-insulated transmission lines and in particular to gas-insulated transmission lines having a corrugated outer conductor and a particle trap contact means suitable for electrical continuity between the particle trap and the corrugated outer conductor.

2. Description of the Prior Art

Compressed gas-insulated transmission lines typically comprise a hollow, cylindrical outer sheath, an inner conductor disposed within, but spaced apart from, the outer sheath, a plurality of insulating spacers which support the conductor in the sheath, and a compressed gas such as sulphur hexafluoride or the like in the sheath to electrically insulate the inner conductor from the sheath or outer conductor. One problem occurring in the use of gas-insulated transmission lines concerns the mobile conducting or semiconducting particle. These particles can cause problems in that they may lower the dielectric strength of the insulating gas and may initiate flashover and breakdown of the gas as they travel between the outer sheath and the inner conductor. Trump, in U.S. Pat. No. 3,515,939, disclosed the means for deactivating and eliminating the deleterious effects of such conducting particles. In that patent, there is described the use of electrodes placed within the outer sheath to create low field regions which trap and deactivate the particles. The low field regions are created by keeping the particle trap electrode at the same potential as that of the outer sheath or outer conductor by means of a particle trap to sheath contact.

A recent development proposes to use corrugated aluminum for the outer conductor instead of the smooth aluminum cylindrical outer sheath. With such a corrugated outer conductor, standard particle trap to sheath contacts are not suitable to keep the particle trap in contact with the corrugated outer conductor and thereby at the same electrical potential. This is because of the large variation between the inside diameter of the sheath and the outside diameter of the particle trap assembly due to the peaks and valleys of the sheath corrugations and because motion occurs between the inner conductor/insulating means/particle trap assembly and the outer corrugated conductor of a gas-insulated transmission line both when the transmission line is first assembled at the factory and while it is in service due to temperature differences between the outer and the inner conductors. Accordingly, it would be desirable to maintain a firm electrical contact between a corrugated outer conductor and a particle trap regardless of the axial position of the particle trap.

SUMMARY OF THE INVENTION

Briefly, the present invention is a transmission line including a corrugated outer tubular conductor, an inner conductor disposed within the outer conductor, an insulating gas which electrically insulates the inner conductor from the outer conductor, particle trapping means disposed proximate the inner periphery of said corrugated outer conductor for trapping foreign particles, and a particle trap to sheath contact means for keeping electrical continuity between the corrugated outer conductor and the particle trapping means for all axial positions of the particle trapping means. The contact means includes an electrical contact disposed on a lever arm which in turn is rotatably disposed on said particle trapping means and biased in a direction to maintain contact between the electrical contact and the outer conductor. In one embodiment of the invention, the lever arm is rotatably attached to the particle trapping means by an axis disposed perpendicular to the direction of travel of the inner conductor. The particle trap to sheath contact means according to the teachings of the invention is also applicable to a gas insulated transmission line having a non-corrugated-elongated cylindrical or tubular outer conductor.

BRIEF DESCRIPTION OF THE DRAWINGS

The invention may be understood and further advantages and uses thereof more readily appreciated when considered in view of the following detailed description of the exemplary embodiments, taken with the accompanying drawings, in which.

DESCRIPTION OF THE PREFERRED EMBODIMENT

Figure 1:
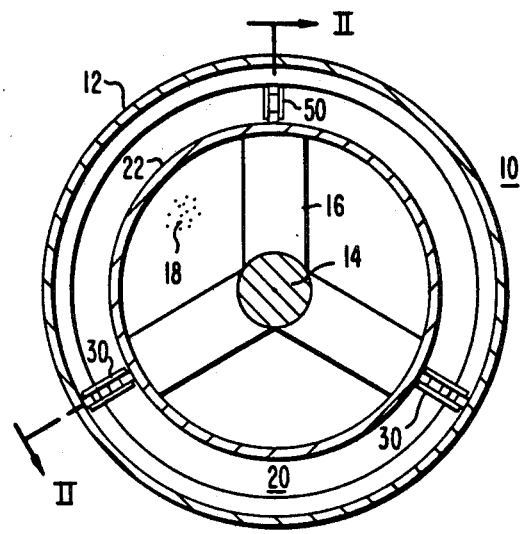
FIG. 1 is a cross-sectional view of a gas-insulated transmission line constructed according to the teachings of the invention.
Figure 2:
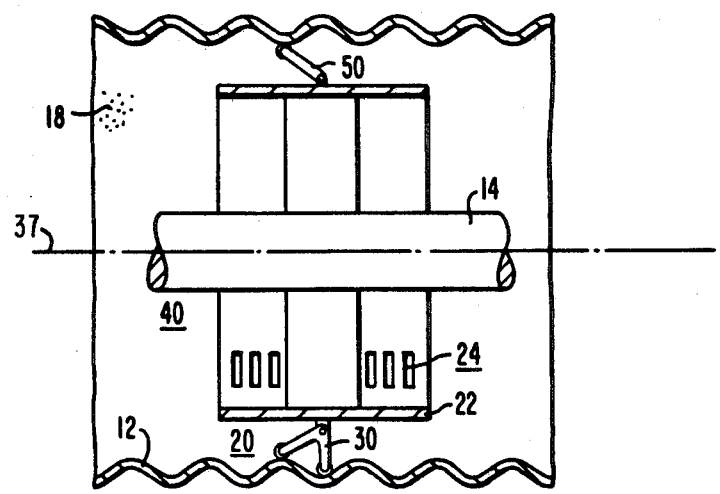
FIG. 2 is a longitudinal cross-sectional view taken along the lines II—II of FIG. 1.

Referring now to the drawings and to FIGS. 1 and 2 in particular, there is shown both vertical and longitudinal cross-sectional views, respectively, of a gas-insulated transmission line 10 constructed according to the teachings of the invention. Gas insulated transmission line 10 includes an elongated, corrugated cylindrical outer sheath or outer conductor 12, and an elongated inner conductor 14 disposed within, and spaced apart from, the corrugated outer conductor 12. The outer sheath or outer conductor 12 will typically be at low or ground electrical potential, whereas the inner conductor 14 will be at high electrical potential with respect to the outer sheath 12, and may typically carry voltages in the range 138–1200 kV. Insulatably supporting the inner conductor 14 within the outer sheath or outer conductor 12 are a plurality of supporting insulators 16, and electrically insulating the inner conductor 14 from the outer conductor 12 is an insulating gas 18, typical of which is sulphur hexafluoride at pressures of approximately 50 lbs/sq. in. gauge. Support insulator 16 is illustrated as a tripost design, although the invention may be utilized with alternate support insulators, such as for example disk or conically shaped, as will be more fully appreciated later. Providing low field regions 20 adjacent to the insulating spacers 16 are particle trapping rings 22 having apertures 24 to facilitate entry of particles into the low field regions 20. In order to produce the low field regions 20, the particle trapping rings 22 must be kept at the same electrical potential as the corrugated outer conductor or outer sheath 12. This is accomplished according to the teachings of this invention by a contact means for keeping an electrical continuity between the corrugated outer conductor 12 and the particle trap 22. Particle trap 22 is illustrated of the ring design having apertures 24 to facilitate entry of particles into the low field regions 20; however, the particle traps may take any configuration so long as they are proximate and have electrical continuity with outer corrugated sheath 12. The inner conductor 14, the outer conductor or outer sheath 12 and the particle trapping rings 22 will typically be of good electrically conducting material such as aluminum.

Since particle trap rings 22 or other particle trap configurations disposed along outer corrugated conductor 12 of gas-insulated transmission line 10 must be kept at the same electrical potential as outer corrugated sheath 12, contact means for keeping electrical continuity between corrugated outer conductor 12 and particle trap 22 is necessary regardless of the axial position of the particle trap along the corrugated outer conductor. During assembly of the transmission line, as well as during expansion or contraction of the inner and outer conductors, movement of the inner conductor/insulator/particle trapping means assembly 40 within a corrugated outer conductor poses significant problems, which the contact means 50 of the present invention overcomes.

Referring again now to FIGS. 1 and 2, there is shown at the top of particle trap 22 contact means 50 for keeping electrical continuity beween the corrugated outer conductor 12 and particle trap 22 regardless of the axial position of the particle trap relative to the corrugations of the corrugated outer conductor 12. Proximate the lower ends of the tripost insulator 16 and thereby separated by approximately 120°, there are shown generally at 30 transport means for supporting and providing axial movement of the inner conductor/insulator/particle trap means assembly 40 along the corrugated outer conductor without radial displacement as more fully described in concurrently filed copending applications "Conductor Load Bearing Roller For A Gas-Insulated Transmission Line Having A Corrugated Outer Conductor", Ser. No. 439,247, filed Nov. 4, 1982 by W. H. Fischer and K. H. Yoon and "Non-Binding Conductor Load Bearing Roller For A Gas-Insulated Transmission Line Having A Corrugated Outer Conductor", Ser. No. 439,248, by W. H. Fischer, both assigned to the same assignee as the present invention.

Figure 3:
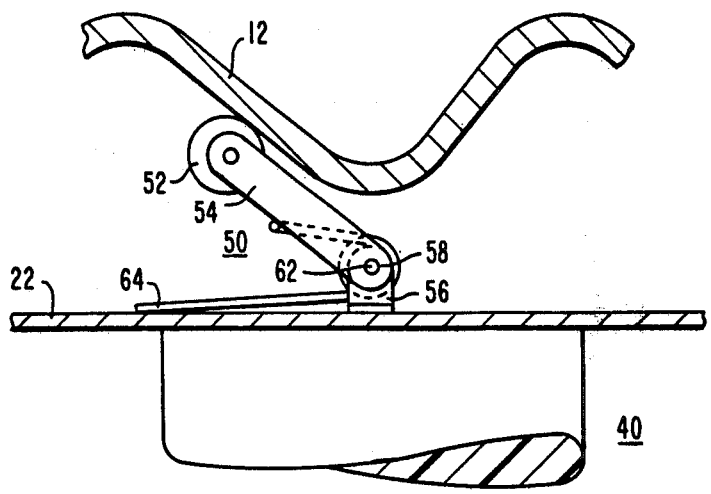
FIG. 3 is an enlarged detailed cross-sectional view of the contact means of FIGS. 1 and 2.

Referring now to FIG. 3 there is shown an enlarged view of contact means 50 for keeping electrical continuity between the corrugated outer conductor or other sheath 12 and the particle trap 22 for all axial positions of particle trap 22 along elongated corrugated outer conductor 12. Contact means 50 includes electrical contact 52 which may be for instance a skid, contact button or, as in the preferred embodiment, a metal roller, disposed at one end of pivot lever 54, which in turn is rotatably disposed on the periphery of particle trap 22 by means of support 56 and pivot pin 58 which pivot pin 58 is disposed along pivot axis 62. Pivot axis 62 is disposed perpendicular to the direction of travel of the insulator/inner conductor/particle trap assembly 40 which is along the axis 37 of gas insulated transmission line 10. Pivot lever 54 and thereby contact means 50 is biased in a direction to ensure contact of electrical contact 52 with corrugated outer conductor or outer sheath 12 by means of torsion spring 64. Reference to FIG. 3 illustrates that contact means assembly 50 will ensure that a firm electrical contact will be maintained between particle trap 22 and outer corrugated sheath 12 regardless of the axial position of inner conductor/insulator/particle trap assembly 40 because contact means assembly 50 will follow the rise and fall of the corrugations of outer conductor 12 so as to compensate for the large variations between the inside diameter of the outer sheath 12 and the outside diameter of particle trap 22. The advantage of using a metal roller for electrical contact 52 is that the electrical contact roller will not produce particles as a sliding contact would when the inner conductor/insulator/particle trap assembly is moved in an axial direction within outer conductor or outer sheath 12.

It is to be understood that contact means assembly 50 must be made of electrical conducting materials such as metal or graphite impregnated materials to at least have electrical contact 52 in electrical continuity with particle trap 22 so as to ensure electrical continuity between particle trap 22 and outer sheath 12.

In conclusion what has been disclosed is a particle trap to sheath contact means for keeping electrical continuity between a corrugated outer conductor of a gas-insulated transmission line and a particle trap for all axial positions of the particle trap relative to the corrugations of the corrugated outer conductor.

Figure 4:
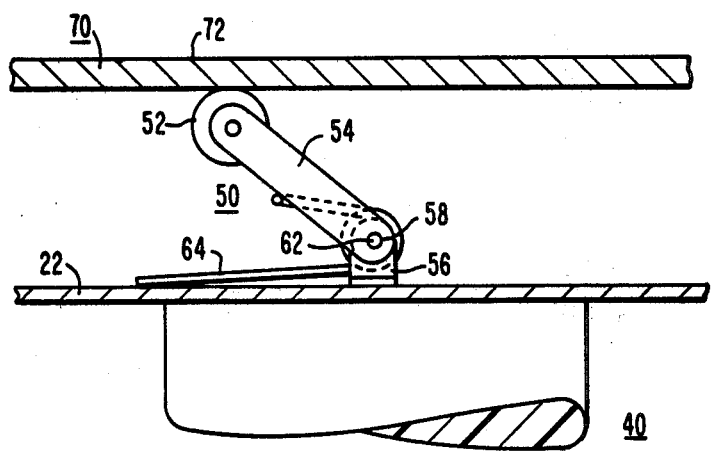
FIG. 4 is the enlarged detailed cross-sectional view of the contact means of FIG. 3 as applied to a gas insulated transmission line having a non-corrugated outer conductor.

The particle trap to sheath contact means according to the teachings of the invention may also be applied to a gas-insulated transmission line having a non-corrugated-elongated cylindrical outer sheath as illustrated in FIG. 4 wherein contact means assembly 50 is disposed within gas-insulated transmission line 70 having non-corrugated elongated cylindrical outer conductor or sheath 72.

We claim:
1. A gas-insulated transmission line, comprising;
(A) a corrugated outer conductor;
(B) an inner conductor adapted for connection to an energizing source and disposed interiorly in said outer conductor;
(C) an insulating gas disposed within the annular space between said outer and inner conductors;
(D) insulating means disposed between said outer and inner conductors for insulatingly supporting said inner conductor within said outer conductor;
(E) particle trapping means for trapping foreign particles disposed proximate the inner periphery of said corrugated outer conductor; and

(F) contact means for keeping electrical continuity between said corrugated outer conductor and said particle trapping means for all axial positions of said particle trapping means relative to the corrugations of said corrugated outer conductor, said contact means including an electrical contact disposed on a lever arm, a rotatable attachment means for rotatably attaching said lever arm to said particle trapping means and a biasing means for biasing said contact means in a direction to make electrical contact with said corrugated outer conductor.

2. The gas-insulated transmission line of claim 1 wherein said rotatable attachment means includes a pivot axis disposed perpendicular to the direction of travel of said inner conductor.

3. The gas-insulated transmission line of claim 2 wherein the electrical contact is a metal roller.

4. A gas-insulated transmission line, comprising;
(A) an elongated tubular outer conductor;
(B) an inner conductor adapted for connection to an energizing source and disposed interiorly in said outer conductor;
(C) an insulating gas disposed within the annular space between said outer and inner conductors;
(D) insulating means disposed between said outer and inner conductors for insulatingly supporting said inner conductor within said outer conductor;
(E) particle trapping means for trapping foreign particles disposed proximate the inner periphery of said outer conductor; and
(F) contact means for keeping electrical continuity between said outer conductor and said particle trapping means for all axial positions of said particle trapping means relative to said outer conductor, said contact means including an electrical contact disposed on a lever arm, a rotatable attachment means for rotatably attaching said lever arm to said particle trapping means and a biasing means for biasing said contact means in a direction to make electrical contact with said elongated tubular outer conductor.

5. The gas-insulated transmission line of claim 4 wherein said rotatable attachment means includes a pivot axis disposed perpendicular to the direction of travel of said inner conductor.

6. The gas-insulated transmission line of claim 5 wherein the electrical contact is a metal roller.

* * * * *